United States Patent [19]
Jackson

[11] 3,788,156
[45] Jan. 29, 1974

[54] EASILY INSTALLED BELT

[76] Inventor: Burtis R. Jackson, c/o George Spector 3615 Woolworth Building 233 Broadway, New York, N.Y. 10007

[22] Filed: June 26, 1972

[21] Appl. No.: 266,344

[52] U.S. Cl. .................................. 74/238, 74/231 J
[51] Int. Cl. .......................... G01f 3/02, F16g 1/00
[58] Field of Search 74/238, 239, 258, 231 P, 231 J

[56] References Cited
UNITED STATES PATENTS

| 3,011,775 | 12/1961 | MacLeod | 74/238 X |
| 2,328,500 | 8/1943 | Salsas | 74/231 R |
| 809,880 | 1/1906 | Woollridge et al. | 74/238 X |
| 2,001,835 | 5/1935 | Cook | 74/238 X |
| 2,991,064 | 7/1961 | De Jean | 74/238 X |
| 3,157,056 | 11/1964 | Gray et al. | 74/238 |
| 3,482,462 | 12/1969 | Dahlem | 74/238 |
| 3,631,732 | 1/1972 | Kleban | 74/231 J |

Primary Examiner—Leonard H. Gerin

[57] ABSTRACT

A temporary replacement for a car endless fan belt, the device consisting of a single length of durable rubber belt that can be stretched to fit around a pump pulley and a crank shaft pulley, so that the car can proceed to travel in case its regular fan belt is broken, thus permitting the automobile reach a Service Station for assistance, one end of the rubber belt having a tubular wire mesh secured therearound and extending therefrom, while the other end of the belt has a male member secured thereto which has a series of barbs projecting radially therefrom, so that when the male member is fitted in the tubular wire mesh on the other end of the belt, the barbs hold the ends securely together.

1 Claim, 3 Drawing Figures

PATENTED JAN 29 1974  3,788,156
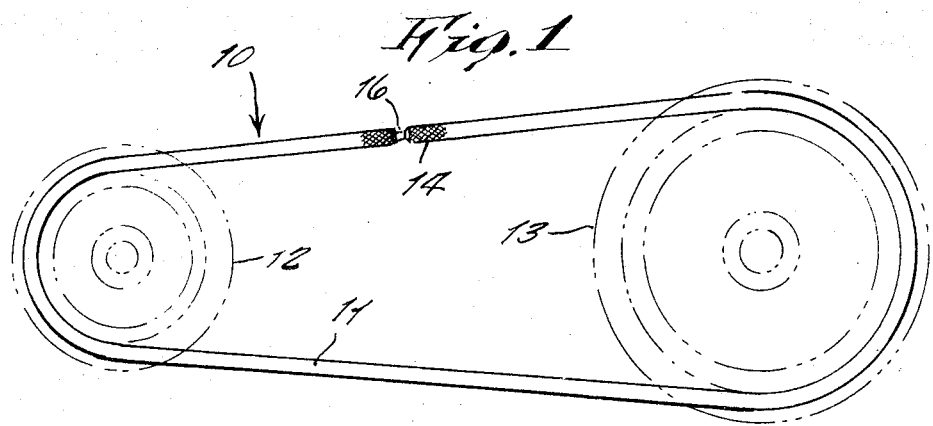
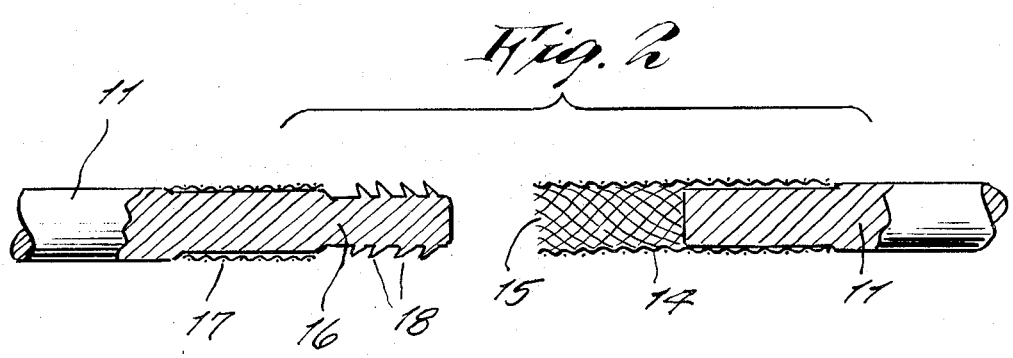
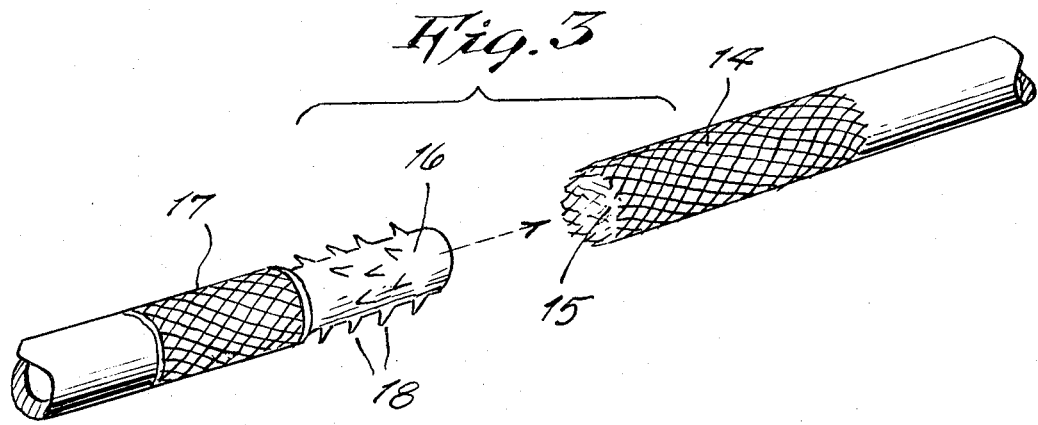

EASILY INSTALLED BELT

This invention relates generally to automotive accessories.

It is well known that sometimes a fan belt of a car can break while a car is traveling, thus causing the engine to overheat. The car is obliged to be stopped to cool and cannot travel very far thereafter without repeated stopping and cooling. This is an unpractical situation.

Accordingly, it is a principle object to provide a temporary belt which can be applied to the automobile so it can continue to travel until it reaches a service station where a proper fan belt replacement may be obtained.

Another obect is to provide an easy belt that can be easily and quickly installed even by a woman motorist.

Other objects are to provide an EASY BELT which is simple in design, inexpensive to manufacture, rugged in construction, easy to use and efficient in operation.

These and other objects will be readily apparent upon a study of the following specification and the accompanying drawing wherein:

FIG. 1 is a side view of the invention installed around a pair of pulleys.

FIG. 2 is an enlarged cross sectional view of the belt ends shown in a same plane and disconnected from each other.

FIG. 3 is a perspective view thereof.

Referring now in detail to the drawing, the reference numeral 10 represents an easy belt according to the present invention wherein there is a belt member 11 made of durable rubber or of surgical tubing that can be stretched to fit around a water pump pulley 12 and a crank shaft pulley 13 of an automobile.

One end of the belt 11 has a tubular shaped wire mesh 14 secured therearound and which extends beyond the belt end so to provide a female opening 15 in its outer end.

The other end of the belt has a male member 16 secured thereto by means of a wire mesh 17 fitted around the belt. The male member 16 has a series of radially extending hard rubber barbs 18 integral therewith.

The opposite ends of the belt can there be interconnected by fitting the male member into the opening 15 so that the barbs 18 get hooked up in the female member wire mesh 14. Thus an easy and quick installation and connection are made possible.

In operative use of the easy belt, it is not necessary to connect the alternator nor generator, because the battery can power the car for a long distance before the battery power is depleted, so that the car can easily reach a Service Station in time for a repair.

In installing the device, the motorist puts the female end over the water pump pulley, runs the other end down under the bottom crank shaft pulley, brings the male end up to the female end, stretching the rubber tubing, and makes the end connection. If a heat factor exists then a heat resistance cover may need to be applied.

Thus an easy belt is provided for allowing a car to run in a cooled condition after its regular fan belt is broken.

While various changes may be made in the detail construction, it is understood that such changes will be within the spirit and scope of the present invention.

I claim:

1. A fan belt for autos comprising a combination of an elongated belt member adaptable for extending around a water pump pulley and a crankshaft pulley for temporary operation in case a regular belt has broken, and means at opposite ends of said belt member for quick and easy interconnection, wherein said belt member comprises an element that is made of stretchable rubber wherein said means compises a tubular shaped female member of wire mesh secured on an end of said belt and which extends beyond the end thereof so to include a female opening, wherein said means also includes a hard rubber male member secured on the other end of said belt and which includes sideward extending barbs for engaging said wire mesh when said male member is inserted into said female member.

* * * * *